United States Patent
Leuninger et al.

(10) Patent No.: US 7,193,005 B2
(45) Date of Patent: Mar. 20, 2007

(54) RADIATION-CURABLE AQUEOUS DISPERSIONS

(75) Inventors: Joerg Leuninger, Mainz (DE); Wolfgang Paulus, Mainz (DE); Anke Mueller, Speyer (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 60 days.

(21) Appl. No.: 10/512,853

(22) PCT Filed: May 21, 2003

(86) PCT No.: PCT/EP03/05311

§ 371 (c)(1),
(2), (4) Date: Nov. 12, 2004

(87) PCT Pub. No.: WO03/099949

PCT Pub. Date: Dec. 4, 2003

(65) Prior Publication Data

US 2006/0058445 A1 Mar. 16, 2006

(30) Foreign Application Priority Data

May 27, 2002 (DE) ................. 102 23 614

(51) Int. Cl.
*C08F 8/00* (2006.01)
*C08G 18/42* (2006.01)
*C08J 3/00* (2006.01)
*C08K 3/20* (2006.01)
*C08L 47/00* (2006.01)

(52) U.S. Cl. ................ 524/500; 427/372.2; 427/385.5; 427/487; 427/493; 427/508; 427/520; 428/500; 522/111; 522/112; 524/502; 525/55; 525/191; 525/193

(58) Field of Classification Search ............. 427/385.5, 427/372.2, 487, 493, 508, 520; 428/500; 522/111, 112; 524/500, 502; 525/55, 191, 525/193, 902
See application file for complete search history.

(56) References Cited

U.S. PATENT DOCUMENTS

| 5,441,775 A | * | 8/1995 | Beck et al. ................. 427/496 |
| 5,990,228 A | | 11/1999 | Eichman et al. |
| 6,096,858 A | * | 8/2000 | Dobbelaar et al. .......... 528/499 |

FOREIGN PATENT DOCUMENTS

| DE | 1248943 | * | 8/1967 |
| DE | 19621027 | * | 5/1996 |
| EP | 0 232 016 | | 8/1987 |
| EP | 0 486 278 | | 5/1992 |
| EP | 0 624 610 | | 11/1994 |
| EP | 0 736 573 | | 10/1996 |
| EP | 1 197 503 | | 4/2002 |
| EP | 1 197 532 | | 4/2002 |

* cited by examiner

*Primary Examiner*—Patrick D. Niland
(74) *Attorney, Agent, or Firm*—Oblon, Spivak, McClelland, Maier & Neustadt, P.C.

(57) ABSTRACT

Aqueous polymer dispersions comprising
a) 50–70% by weight of polymer particles composed of at least two different (co)polymers having glass transition temperatures each above 50° C. and synthesized from
at least 80% by weight of at least one principal monomer, 0.1–10% by weight of at least one auxiliary monomer, and 0–3% by weight of at least one crosslinker molecule,
the difference in the glass transition temperatures ($T_g$) of the different polymers being at least 10° C., and
b) 30–50% by weight of at least one polyfunctional (meth) acrylate,
the dispersion a) being subjected to physical and/or chemical deodorization.

23 Claims, No Drawings

RADIATION-CURABLE AQUEOUS DISPERSIONS

The present invention relates to the preparation and use of aqueous, radiation-curable polymer dispersions for coating substrates.

In radiation curing the use of aqueous polymer dispersions is on the increase with the aim of avoiding the need to handle monomers. Systems of this kind are outstandingly suitable for open-pored substrates, especially paper and wood. Use is made predominantly of aqueous emulsions of unsaturated polyesters or polyester (meth)acrylates. A disadvantage of these systems, however, is their liquid nature, often resulting in films which are tacky after the water has evaporated. This causes problems especially in radiation curing of three-dimensional articles, since no curing takes place in the shadow regions and so tacky areas remain. For this reason, polyurethane dispersions with UV-curable groups were developed. These dispersions are tack-free after filming. These dispersions are exclusively secondary dispersions, which are situated very high in terms of their structure. Where inexpensive aromatic isocyanates such as TDI are used, the films produced from the dispersions have a high propensity toward yellowing, which rules out applications involving white pigmentation.

Besides freedom from tack, the freedom of such coating systems from solvents and auxiliary film formers is desirable from an environmental standpoint. Moreover, a multiplicity of applications call for hard surfaces on the coatings.

EP 486 278 discloses radiation-curable aqueous dispersions composed of mixtures of an emulsion polymer ($T_g<28°$ C.) that cannot be cured by radiation with a (meth)acrylate that can.

EP 624 610 describes comparable systems, but where the emulsion polymer absolutely must have a $T_g>30°$ C.

EP 232 016 describes emulsion polymers for which preliminary crosslinking is mandatory (gel fraction>1%). The polymers are formulated for radiation curability by blending with a polyunsaturated compound or else by copolymerization with crosslinkers of differing reactivity.

EP 736 573 describes multistage emulsion polymers which are formulated for radiation curability by blending with a polyunsaturated (meth)acrylate.

These prior art dispersions do not make it possible, however, to meet satisfactorily the requirements set out above.

It is an object of the present invention to provide storage-stable, aqueous, radiation-curable polymer dispersions which can be formulated solventlessly and lead to tack-free coatings before radiation curing and to coatings of high hardness after radiation curing.

We have found that this object is achieved by aqueous polymer dispersions comprising a) 50–70% by weight of polymer particles composed of at least two different (co)polymers having glass transition temperatures each above 50° C. and synthesized from
at least 80% by weight of at least one principal monomer,
0.1–10% by weight of at least one auxiliary monomer, and 0–3% by weight of at least one crosslinker molecule, the difference in the glass transition temperatures ($T_g$) of the different polymers being at least 10° C., and
b) 30–50% by weight of at least one polyfunctional (meth) acrylate, the dispersion a) being subjected to physical and/or chemical deodorization.

The polymer dispersions of the invention contain 50–70% by weight of polymer particles and 30–50% by weight of polyfunctional (meth)acrylate b), such that the sum thereof makes 100% by weight.

Naturally, the polymer dispersions of the invention also contain water, in which the polymer particles are dispersed.

The aqueous polymer dispersions preferably contain 55–65% by weight of a) and 35–45% by weight of b) and with particular preference 60–65% by weight of a) and 35–40% by weight of b).

The coatings obtained from the dispersion are tack-free before UV curing and have a high surface hardness after radiation curing.

The dispersions of the invention are stable on storage; that is when stored at 50° C. for 14 days or at room temperature for six months no change can be found. The dispersions of the invention can be filmed at below 20° C. even without auxiliary film formers, the coatings obtainable with the dispersions being tack-free prior to UV curing and of high surface hardness and chemical resistance after radiation curing.

The (co)polymers which form the polymer particles in a) are composed in each case of at least 80% by weight of at least one principal monomer, from 0.1 to 10% by weight of at least one auxiliary monomer, and from 0 to 3% by weight of at least one crosslinker molelcule, with the proviso that the sum makes 100% by weight.

Principal monomers therein include, for example, methyl (meth)acrylate, ethyl (meth)acrylate, n-propyl (meth)acrylate, n-butyl (meth)acrylate, iso-butyl (meth)acrylate, sec-butyl (meth)acrylate, n-pentyl (meth)acrylate, iso-pentyl (meth)acrylate, 2-methylbutyl (meth)acrylate, amyl (meth) acrylate, n-hexyl (meth)acrylate, 2-ethylbutyl (meth)acrylate, pentyl (meth)acrylate, n-heptyl (meth)acrylate, n-octyl (meth)acrylate, 2-ethylhexyl (meth)acrylate, n-decyl (meth) acrylate, undecyl (meth)acrylate, n-dodecyl (meth)acrylate, 2-methoxyethyl (meth)acrylate, 2-ethoxyethyl (meth)acrylate, 4-methoxybutyl (meth)acrylate, 2-(2'-methoxyethoxy) ethyl (meth)acrylate, vinyl chloride, vinylidene chloride, vinyl acetate, vinyl propionate, vinyl butyrate, methyl vinyl ketone, vinyltoluene, vinylnaphthalene, methyl vinyl ether, ethyl vinyl ether, n-propyl vinyl ether, iso-propyl vinyl ether, n-butyl vinyl ether, sec-butyl vinyl ether, iso-butyl vinyl ether, tert-butyl vinyl ether, n-octyl vinyl ether, ethylene, propylene, 1-butene, 2-butene, iso-butene, cyclopentene, cyclohexene, cyclododecene, butadiene, isoprene, chloroprene, styrene, α-methylstyrene, tert-butylstyrene, and mixtures thereof.

Preferred principal monomers are methyl methacrylate, n-butyl acrylate, ethylhexyl acrylate, and the aforementioned vinylaromatics; particular preference is given to methyl methacrylate, n-butyl acrylate, and ethylhexyl acrylate.

Auxiliary monomers are, for example, functionalized monomers, such as those which carry carboxyl, hydroxyl, epoxy, allyl, carboxamide, amine, isocyanato, hydroxymethyl, methoxymethyl or silyloxy groups. These monomers may be, for example, (meth)acrylic acid, (meth)acrylic acid formal, hydroxymethyl (meth)acrylate, 2-hydroxyethyl (meth)acrylate, 2-hydroxypropyl (meth)acrylate, 3-hydroxypropyl (meth)acrylate, 4-hydroxybutyl (meth)acrylate, 4-hydroxybutyl vinyl ether, benzophenoneglycidyl (meth) acrylate, 2-sulfoethyl (meth)acrylate, (meth)acrylamide, N-methylol(meth)acrylamide, fumaric acid, iso-propyl fumarate, n-hexyl fumarate, fumaric monoamide, fumaric diamide, fumaric mononitrile, fumaric dinitrile, crotonic acid, glycidyl crotonate, itaconic acid, itaconic monoesters, itaconic anhydride, citraconic acid, citraconic monoesters, citraconic anhydride, succinic acid, maleic acid, monomethyl maleate, monoethyl maleate, monobutyl maleate, maleic anhydride, maleic monoamide, maleic diamide, N-methylolmaleamide, vinylsuccinimide, vinylimidazole, 2-vinylpyridine, 4-vinylpyridine, N-vinylpyrrolidone, N-vinylpiperidone, N-vinylcaprolactam, sodium vinylsulfonate, tetraallyloxyethane, diallyl phthalate, diallyl succinate, tetraallylethane, Tetraallyloxysilane, allyl glycidyl ether, ureido(meth)acrylate, triallyl cyanurate, triallyl isocyanurate, diketene, monoethylenically unsaturated carboxylic acids having 3 to 8 carbon atoms and their water-soluble alkali metal, alkaline earth metal or ammonium salts such as, for example: acrylic acid, methacrylic acid, dimethylacrylic acid, ethacrylic acid, maleic acid, citraconic acid, methylenemalonic acid, crotonic acid, fumaric acid, mesaconic acid, itaconic acid, allylacetic acid, vinylacetic acid, and mixtures thereof.

Preferred auxiliary monomers are methacrylic acid, acrylic acid, acrylamide, 2-hydroxyethyl (meth)acrylate, 2-hydroxypropyl (meth)acrylate, 3-hydroxypropyl (meth) acrylate, 4-hydroxybutyl (meth)acrylate, and 4-hydroxybutyl vinyl ether; particular preference is given to acrylic acid, methacrylic acid, acrylamide, and hydroxyethyl acrylate.

Crosslinker molecules are those polymerizable compounds having more than one polymerizable double bond, such as vinyl ether groups or (meth)acrylate groups. Examples that may be mentioned include 1,4-butanediol diacrylate, allyl methacrylate, ethylene glycol (meth)acrylate, propylene glycol (meth)acrylate, 1,6-hexanediol di(meth)acrylate, 1,2-ethylene glycol di(meth)acrylate, 1,2-neopentyl glycol di(meth)acrylate, diethylene glycol di(meth)acrylate, triethylene glycol di(meth)acrylate, tetraethylene glycol di(meth)acrylate, trimethylolpropane tri (meth)acrylate, trimethyloethane tri(meth)acrylate, pentaerythritol tri(meth)acrylate and tetra(meth)acrylate and divinylbenzene.

The at least two different (co)polymers of which the polymer particles are composed are selected such that the polymers have glass transition temperatures which are above 50° C. and differ by at least 10° C.

The glass transition temperature can be determined by customary methods such as differential thermal analysis or differential scanning calorimetry (DSC, preferably by the method of ASTM 3418/82, midpoint temperature).

The (co)polymerization may be conducted in a manner known per se to the skilled worker: for example, as a bulk, emulsion, miniemulsion, suspension, solution, precipitation, water-in-oil emulsion, inverted suspension or microsuspension polymerization. Preference is given to precipitation, suspension, solution, and emulsion polymerization, especially to emulsion polymerization.

The polymerization may take place free-radically, anionically, cationically or coordinatively, preferably free-radically.

One frequent—albeit not the only—method of preparing the (co)polymers referred to is that of free-radical (co) polymerization in a solvent or diluent.

The free-radical (co)polymerization in such monomers is effected, for example, in aqueous medium in the presence of polymerization initiators which break down into free radicals under polymerization conditions. The (co)polymerization may be performed within a wide temperature range, where appropriate under subatmospheric or superatmospheric pressure, generally at temperatures up to 100° C. The pH of the reaction mixture is commonly set in the range from 4 to 10.

The monomer or monomer mixture is (co)polymerized using free-radical polymerization initiators, examples being radically decomposing azo compounds, such as 2,2'-azobisisobutyronitrile, 2,2'-azobis-(2-amidinopropane) hydrochloride, and 4,4'-azobis(4'-cyanopentanoic acid).

These compounds are generally used in the form of aqueous solutions, the lower concentration being governed by the amount of water that is acceptable in the (co) polymerization and the upper concentration by the solubility of the respective compound in the solvent. The concentration is generally from 0.1 to 30% by weight, preferably from 0.5 to 20% by weight, with particular preference from 1.0 to 10% by weight, based on the solution.

The amount of initiators is generally from 0.1 to 10% by weight, preferably from 0.1 to 5% by weight, based on the monomers to be (co)polymerized. It is also possible for two or more different initiators to be used for the (co)polymerization.

Examples of solvents or diluents which can be used include water, alcohols, such as methanol, ethanol, n- or iso-propanol, n- or iso-butanol, or ketones, such as acetone, ethyl methyl ketone, diethyl ketone or iso-butyl methyl ketone.

Where appropriate the (co)polymerization may be conducted in the presence of polymerization regulators, such as hydroxylammonium salts, chlorinated hydrocarbons, and thio compounds, such as tert-butyl mercaptan, ethylacrylic thioglycolate, mercaptoethynol, mercaptopropyltrimethoxysilane, dodecyl mercaptan, and tert-dodecyl mercaptan, for example, or alkali metal hypophosphites. In the (co)polymerization these regulators can be used, for example, in amounts of from 0 to 0.8 part by weight per 100 parts by weight of monomers to be (co)polymerized, and reduce the molar mass of the resultant (co)polymer.

The preparation may also be effected, for example, by solution polymerization with subsequent dispersion in water.

Where the polymerization is conducted as an emulsion or suspension polymerization, use is made of ionic and/or nonionic emulsifiers and/or protective colloids and/or stabilizers as surface-active compounds.

Depending on the conditions under which the (co)polymerization is conducted it produces (co)polymers or, where appropriate, crosslinked particles of differing molecular weights. (Co)polymers of high molecular weight are preferably prepared by (co)polymerizing the monomers in water. (Co)polymers with high molecular weights are also obtained, for example, by (co)polymerizing the monomers in the form of an inverted suspension polymerization or by (co)polymerizing the monomers by the method of water-in-oil polymerization.

In the case of the process of inverted suspension polymerization and also of water-in-oil polymerization, the oil phase used comprises saturated hydrocarbons, examples being hexane, heptane, cyclohexane, and decalin, or aromatic hydrocarbons, such as benzene, toluene, xylene, and cumene. The ratio of oil phase to aqueous phase in the case of inverted suspension polymerization is, for example, from 10:1 to 1:10.

(Co)polymer of low molecular weight is obtained if the (co)polymerization is conducted in the presence of polymerization regulators or in a solvent which regulates the (co) polymerization, examples being alcohols, such as methanol, ethanol, n- or iso-propanol, or ketones, such as acetone, ethyl methyl ketone, diethyl ketone or iso-butyl methyl ketone.

(Co)polymers with low molecular weights are also obtained by means of the standard methods, i.e., using fairly large amounts of polymerization initiator or using polymerization regulators, or through combinations of said measures.

Preferred (co)polymers are those having an average molecular weight $M_w$ of more than 20000, with particular preference more than 50000 ($M_w$ is determined by gel permeation chromatography with polystyrene as standard and tetrahydrofuran as eluent).

In the emulsion polymerization use is made of ionic and/or nonionic emulsifiers and/or protective colloids and/or stabilizers as surface-active compounds.

A detailed description of suitable protective colloids can be found in Houben-Weyl, Methoden der organischen Chemie, Volume XIV/1, Makromolekulare Stoffe [Macromolecular Substances], Georg-Thieme-Verlag, Stuttgart, 1961, pp. 411 to 420. Suitable emulsifiers include anionic, cationic, and nonionic emulsifiers. As accompanying surface-active substances it is preferred to use exclusively emulsifiers, whose molecular weights, unlike those of protective colloids, are normally below 2000 g/mol. Where mixtures of surface-active substances are used, the individual components must of course be compatible with one another, something which can be checked in case of doubt by means of a few preliminary tests. It is preferred to use anionic and nonionic emulsifiers as surface-active substances. Common accompanying emulsifiers are, for example, ethoxylated fatty alcohols (EO units: 3 to 50, alkyl: $C_8$ to $C_{18}$), ethoxylated mono-, di-, and trialkylphenols (EO units: 3 to 50, alkyl: $C_4$ to $C_9$), alkali metal salts of dialkyl esters of sulfosuccinic acid and also alkali metal and ammonium salts of alkyl sulfates (alkyl: $C_8$ to $C_{18}$), of ethoxylated alkanols (EO units: 4 to 30, alkyl: $C_{12}$ to $C_{18}$), of ethoxylated alkylphenols (EO units: 3 to 50, alkyl: $C_4$ to $C_9$), of alkylsulfonic acids (alkyl: $C_{12}$ to $C_{18}$), and of alkylarylsulfonic acids (alkyl: $C_9$ to $C_{18}$).

Sulfonates, sulfates, and carboxylates are preferred, with appropriate metal counterions.

Suitable emulsifiers can also be found in Houben-Weyl, Methoden der organischen Chemie, Volume 14/1, Makromolekulare Stoffe, Georg Thieme Verlag, Stuttgart, 1961, pages 192 to 208.

Trade names of emulsifieres are, for example, Dowfax®2 A1, Emulan® NP 50, Dextrol® OC 50, Emulgator 825, Emulgator 825 S, Emulan® OG, Texapon® NSO, Nekanil® 904 S, Lumiten® I-RA, Lumiten E 3065, Disponil FES 77, Lutensol AT 18, Steinapol VSL, and Emulphor NPS 25.

The surface-active substance is usually used in amounts of from 0.1 to 20% by weight, preferably from 1 to 20 and with particular preference from 1.5 to 10% by weight based on the monomers to be polymerized.

Water-soluble initiators for the emulsion polymerization are, for example, ammonium and alkali metal salts of peroxodisulfuric acid, e.g., sodium peroxodisulfate, hydrogen peroxide, or organic peroxides, e.g., tert-butyl hydroperoxide.

Particularly suitable initiator systems are those known as reduction-oxidation (redox) systems.

The redox initiator systems are composed of at least one, usually inorganic, reducing agent and one organic or inorganic oxidizing agent.

The oxidizing component comprises, for example, the emulsion polymerization initiators already mentioned above.

The reducing components comprise, for example, alkali metal salts of sulfurous acid, such as sodium sulfite, sodium hydrogen sulfite, alkali metal salts of disulfurous acid such as sodium disulfite, bisulfite addition compounds with aliphatic aldehydes and ketones, such as acetone bisulfite, or reducing agents such as hydroxymethanesulfinic acid and its salts, or ascorbic acid. The redox initiator systems may be used together with soluble metal compounds whose metallic component is able to exist in a plurality of valence states.

Examples of customary redox initiator systems include ascorbic acid/iron(II) sulfate/sodium peroxodisulfate, tert-butyl hydroperoxide/sodium disulfite, and tert-butyl hydroperoxide/Na hydroxymethanesulfinate. The individual components, the reducing component for example, may also be mixtures, an example being a mixture of the sodium salt of hydroxymethanesulfinic acid with sodium disulfite.

These compounds are generally used in the form of aqueous solutions or emulsions, the lower concentration being governed by the amount of water that is acceptable in the dispersion and the upper concentration by the solubility of the respective compound in water. The concentration is generally from 0.1 to 30% by weight, preferably from 0.5 to 20% by weight, with particular preference from 1.0 to 10% by weight, based on the solution.

The amount of the initiators is generally from 0.1 to 10% by weight, preferably from 0.5 to 5% by weight, based on the monomers to be polymerized. It is also possible for two or more different initiators to be used in the emulsion polymerization.

During the polymerization it is possible to use regulators, in amounts for example of from 0 to 0.8 part by weight per 100 parts by weight of the monomers to be polymerized; their effect is to reduce the molar mass. Suitable, for example, are compounds containing a thiol group, such as tert-butyl mercaptan, ethylacrylic thioglycolate, mercaptoethynol, mercaptopropyltrimethoxysilane, and tert-dodecyl mercaptan.

The emulsion polymerization takes place generally at from 30 to 130° C., preferably at from 50 to 95° C. The polymerization medium may consist either of water alone or of mixtures of water with water-miscible liquids such as methanol. Preferably, just water is used. The emulsion polymerization may be conducted either as a batch operation or in the form of a feed process, including staged or gradient procedures. Preference is given to the feed process, in which a portion of the polymerization batch is introduced as an initial charge and is heated to the polymerization temperature, polymerization is begun, and then the remainder of the polymerization batch is supplied to the polymerization zone continuously, in stages or under a concentration gradient, usually by way of two or more spatially separate feed streams, of which one or more contain the monomers in neat or emulsified form, and during this addition the polymerization is maintained. In order to obtain the desired particle size more effectively, for example, it is possible to include a polymer seed in the initial polymerization charge, at 0.1–3% by weight, for example.

The manner in which the initiator is added to the polymerization vessel in the course of free-radical aqueous emulsion polymerization is known to the skilled worker. It may either be included in its entirety in the initial charge to the polymerization vessel or else introduced continuously or in stages in the course of the free-radical aqueous emulsion polymerization, at the rate at which it is consumed. Specifically this will depend both on the chemical nature of the initiator system and on the polymerization temperature. Preferably, some is included in the initial charge and the remainder is supplied to the polymerization zone at the rate of consumption.

In order to remove the residual monomers it is common to add initiator after the end of the emulsion polymerization proper as well, i.e., after a monomer conversion of at least 95%.

In the case of the feed process, the individual components can be added to the reactor from the top, at the side or from below, through the reactor floor.

In the case of emulsion polymerization, aqueous polymer dispersions with solids contents of generally from 15 to 75% by weight, preferably from 40 to 75% by weight, are obtained.

For a high space/time yield of the reactor, dispersions with a very high solids content are preferred. In order to be able to achieve solids contents >60% by weight, a bimodal or polymodal particle size ought to be set, since otherwise the viscosity becomes too high and the dispersion unmanageable. Creating a new generation of particles can be done, for example, by adding seed (EP 81083), by adding excess quantities of emulsifier, or by adding miniemulsions. A further advantage associated with the combination of low viscosity and high solids content is the improved coating behavior. Creating one or more new generations of particles can be done at any point in time. It depends on the particle size distribution which is being aimed at for a low viscosity.

The copolymer is preferably used in the form of its aqueous dispersion.

Where the polymerization is effected in the presence of a seed latex, such a seed is not counted in the number of polymers which form the polymer particle.

The polymer particles preferably have average sizes of 100–500 nm, with particular preference 100–250 nm, in a distribution which with very particular preference is monomodal.

The particles may be homogeneous or heterogeneous in construction. In the case of a heterogeneous construction, it is possible for there to be one core and one or more shells.

Where the particles are composed of core and at least one shell, then the refractive indices of core and shell(s) should be as close as possible, for enhanced transparency. The difference is preferably not more than 0.1, with particular preference not more than 0.075, and with very particular preference not more than 0.05.

The polymer dispersions of the invention are obtainable by chemically and/or physically deodorizing (aftertreating) the dispersions a) and then incorporating the polyfunctional (meth)acrylate b). The invention likewise provides a process for preparing polymer dispersions of the invention by deodorizing the dispersions a) chemically and/or physically and then incorporating b).

With the aim of reducing the amount of residual monomers, the polymerization reaction is followed by chemical and/or physical, preferably chemical, deodorization of the dispersion a).

A physical deodorization may consist in stripping the dispersion with steam, an oxygenous gas, preferably air, nitrogen or supercritical carbon dioxide in, for example, a stirred vessel, as described in DE-B 12 48 943, or in a countercurrent column, as described in DE-A 196 21 027.

Depending on the amounts and on the boiling points of the components to be separated off, deodorization takes place in one or more stages. Generally speaking, the volatile constituents with a boiling point at atmospheric pressure of up to about 200° C. are largely separated off.

This can be combined with a chemical deodorization, that is, a postpolymerization performed by adding an initiator, as described, for example, in DE-A 198 28 183.

As oxidizing and reducing agent components it is possible, for example, to use organic or inorganic hydroperoxides, such as tert-butyl hydroperoxide, butyl peroxide, hydrogen peroxide, alkali metal or alkaline earth metal persulfates, perborates or percarbonates, and also sodium hydroxymethylsulfinate, ascorbic acid, Mohr's salt, etc., preferably tert-butyl hydroperoxide and sodium hydroxymethylsulfinate.

The chemical deodorization is generally carried out at a temperature of from 40 to 90° C. through a period ranging from 15 minutes to 3 hours.

In this procedure, either both redox components can be metered in, simultaneously or in portions, or some or all of one component can be included in the initial charge and the remainder of the component and/or other component can be metered in over a period ranging, for example, from 5 to 120 minutes, preferably from 30 to 90 minutes, and with particular preference from 45 to 75 minutes. Metering may be carried out continuously or else discontinuously.

The amount of reducing and/or oxidizing component used is in each case 0.01–0.5% by weight, preferably 0.05–0.2% by weight, based on the amount of polymer in the dispersion to be deodorized. The ratio of the amount of reducing component used to the amount of oxidizing component used is arbitrary.

Chemical deodorization may be followed by neutralization of the dispersion using, for example, sodium hydroxide, potassium hydroxide, sodium hydrogen carbonate, potassium hydrogen carbonate, sodium carbonate, potassium carbonate or milk of lime to the desired pH of, for example, from 6 to 8, preferably from 6.5 to 7.5.

For the further removal of, say, residual oxidizing constituents, further reducing agent can be added, and may be the same one or different one than that mentioned above, and is added in amounts of 0.01–0.5% by weight, preferably 0.01–0.2% by weight, based on the amount of polymer in the dispersion to be deodorized, so that the reducing agent is used as the whole amount in excess over the oxidizing agent. This further reducing agent may be selected from the following components: sodium hydroxymethylsulfinate, ascorbic acid, Mohr's salt, etc. Ascorbic acid is used with preference.

Following deodorization, the residual monomer content is generally not more than 300 ppm.

It has surprisingly been found that by virtue of chemical deodorization it was possible to achieve an increased storage stability of the dispersion blended with polyfunctional (meth)acrylate b) (see below).

Polyfunctional (meth)acrylates b) are compounds which carry at least 2, preferably 3–10, with particular preference 3–6, with very particular preference 3–4, and in particular 3 (meth)acrylate groups, preferably acrylate groups.

These may be, for example, esters of (meth)acrylic acid with polyalcohols which appropriately have a functionality of at least two.

Examples of such polyalcohols are at least dihydric polyols, polyetherols or polyesterols or polyacrylate polyols having an average OH functionality of at least 2, preferably from 3 to 10.

Examples of polyalcohols with a functionality of at least two are 1,2-propanediol, ethylene glycol, 2,2-dimethyl-1,2-ethanediol, 1,3-propanediol, 1,2-butanediol, 1,4-butanediol, 3-methylpentane-1,5-diol, 2-ethylhexane-1,3-diol, 2,4-diethyloctane-1,3-diol, 1,6-hexanediol, polyTHF with a molar mass of between 162 and 378, poly-1,3-propanediol with a molar mass between 134 and 598, poly-1,2-propanediol with a molar mass between 134 and 598, polyethylene glycol with a molar mass between 106 and 458, neopentyl glycol, neopentyl glycol hydroxypivalate, 2-ethyl-1,3-propanediol, 2-methyl-1,3-propanediol, 2-ethyl-1,3-hexanediol, 2,2-bis (4-hydroxycyclohexyl)propane, 1,1-, 1,2-, 1,3- and 1,4-cyclohexanedimethanol, 1,2-, 1,3- and 1,4-cyclohexanediol, trimethylolbutane, trimethylolpropane, trimethylolethane, pentaerythritol, glycerol, ditrimethylolpropane, dipentaerythritol, sorbitol, mannitol, diglycerol, threitol, erythritol, adonitol (ribitol), arabitol (lyxitol), xylitol, dulcitol (galactitol), maltitol or isomalt.

Further suitable polyalcohols with a functionality of at least two are alkoxylated polyalcohols.

Examples of suitable alkylene oxides include ethylene oxide, propylene oxide, iso-butylene oxide, vinyloxirane, and styrene oxide.

The alkylene oxide chain may be composed preferably of ethylene oxide, propylene oxide and/or butylene oxide units. Such a chain may be composed of one species of an alkylene oxide or of a mixture of alkylene oxides. Where a mixture is used the different alkylene oxide units may be present randomly or as a block or as blocks of individual species. A preferred alkylene oxide is ethylene oxide, propylene oxide or a mixture thereof, with particular preference ethylene oxide or propylene oxide, and with very particular preference ethylene oxide.

The number of alkylene oxide units in the chain is, for example, from 1 to 20, preferably from 1 to 10, with particular preference 1–5, and especially 1–3, and very preferably 1, based on the respective hydroxyl groups of the polyalcohol.

Suitable starter alcohols include the abovementioned polyalcohols with a functionality of at least two.

Examples of suitable polyesterols are those preparable by esterifying polycarboxylic acids, preferably dicarboxylic acids, with diols and at least one of the abovementioned polyalcohols.

The starting materials for such polyesterols are known to the skilled worker. As polycarboxylic acids it is possible with preference to use oxalic acid, maleic acid, fumaric acid, succinic acid, glutaric acid, adipic acid, sebacic acid, dodecanedioic acid, o-phthalic acid, isophthalic acid, terephthalic acid, trimellitic acid, azelaic acid, 1,4-cyclohexanedicarboxylic acid or tetrahydrophthalic acid, their isomers and hydrogenation products, and also esterifiable derivatives, such as anhydrides or dialkyl esters, examples being $C_1$–$C_4$ alkyl esters, preferably methyl, ethyl or n-butyl esters of said acids.

Suitable hydroxyl-carrying carboxylic acids or lactones include 4-hydroxybenzoic acid, 6-hydroxy-2-naphthoic acid, pivalolactone, and ε-caprolactone.

Suitable diols include polyTHF with a molar mass of between 162 and 738, poly-1,2- or -1,3-propanediol with a molar mass of between 134 and 598, polyethylene glycol with a molar mass of between 106 and 458, 3-methylpentane-1,5-diol, 2-ethylhexane-1,3-diol, 2,4-diethyloctane-1,3-diol, 1,6-hexanediol, 1,4-butanediol, neopentyl glycol hydroxypivalate, 2-ethyl-1,3-propanediol, 2-methyl-1,3-propanediol, 2-ethyl-1,3-hexanediol, 2,2-bis(4-hydroxycyclohexyl)propane, 1,1-, 1,2-, 1,3- and 1,4-cyclohexanedimethanol, and 1,2-, 1,3- and 1,4-cyclohexanediol.

Suitable polyalcohols include the abovementioned alcohols of functionality at least two, preferably neopentyl glycol, trimethylolpropane, trimethylolethane or pentaerythritol.

The molecular weights $M_n$ of the polyesterols and polyetherols are preferably between 100 and 4000 ($M_n$ is determined by gel permeation chromatography using polystyrene as standard and tetrahydrofuran as eluent).

Further possible polyfunctional (meth)acrylates b) are polyester (meth)acrylates, epoxy (meth)acrylates, urethane (meth)acrylates, and (meth)acrylated polyacrylates. Instead of the (meth)acrylate groups it is also possible to use other groups which can be polymerized free-radically or cationically.

Urethane (meth)acrylates, for example, are obtainable by reacting polyisocyanates with hydroxyalkyl (meth)acrylates or hydroxyalkyl vinyl ethers and, where appropriate, chain extenders such as diols, polyols, diamines, polyamines or dithiols or polythiols. Urethane (meth)acrylates which can be dispersed in water without the addition of emulsifiers additionally contain ionic and/or nonionic hydrophilic groups, which are introduced into the urethane, for example, by synthesis components such as hydroxycarboxylic acids.

Preferred polyfunctional (meth)acrylates b) are trimethylolpropane triacrylate, acrylates of ethoxylated and/or propoxylated trimethylolpropane, pentaerythritol, glycerol or ditrimethylolpropane. Particularly preferred acrylates are those of ethoxylated and/or propoxylated trimethylolpropane or pentaerythritol.

In one preferred embodiment the at least one polyfunctional (meth)acrylate b) is incorporated into the dispersion containing the polymer particles at elevated temperature, i.e., at above room temperature, preferably above 40° C., with particular preference at a temperature from 60 to 100° C., and with very particular preference at from 80 to 90° C.

The amount of polyfunctional (meth)acrylates b) is chosen so that the resulting blend has a minimum film formation temperature of less than 20° C.

The solids content of the dispersions can be adjusted in accordance with the desired viscosity, from 50 to 500 mPas for example, and is generally situated between 20 and 80% by weight, in particular between 30 and 70% by weight.

The dispersions of the invention may further comprise additives known per se to the skilled worker, examples being photoinitiators and other additives.

As photoinitiators it is possible to use photoinitiators which are known to the skilled worker, examples being those in "Advances in Polymer Science", Volume 14, Springer Berlin 1974 or in K. K. Dietliker, Chemistry and Technology of UV and EB Formulation for Coatings, Inks and Paints, Volume 3; Photoinitiators for Free Radical and Cationic Polymerization, P. K T. Oldring (Eds), SITA Technology Ltd, London.

Suitable examples include monoacyl- and bisacylphosphine oxides, as described, for example, in EP-A 7 508, EP-A 57 474, DE-A 196 18 720, EP-A 495 751 or EP-A 615 980, such as 2,4,6-trimethylbenzoyldiphenylphosphine oxide (Lucirin® TPO), ethyl 2,4,6-trimethylbenzoylphenylphosphinate, Irgacure® 819 from Ciba Spezialitätenchemie (bis(2,4,6-trimethylbenzoyl)phenylphosphine oxide), benzophenones, hydroxyacetophenones, phenylglyoxylic and its derivatives or mixtures of these photoinitiators. Examples that may be mentioned include benzophenone, acetophenone, acetonaphthoquinone, methyl ethyl ketone, valerophenone, hexanophenone, α-phenylbutyrophenone, p-morpholinopropiophenone, dibenzosuberone, 4-morpholinobenzophenone, 4-morpholinodeoxybenzoin, p-diacetylbenzene, 4-aminobenzophenone, 4'-methoxyacetophenone, β-methylanthraquinone, tert-butylanthraquinone, anthraquinonecarboxylic esters, benzaldehyde, α-tetralone, 9-acetylphenanthrene, 2-acetylphenanthrene, 10-thioxanthenone, 3-acetylphenanthrene, 3-acetylindole, 9-fluorenone, 1-indanone, 1,3,4-triacetylbenzene, thioxanthen-9-one, xanthen-9-one, 2,4-dimethylthioxanthone, 2,4-diethylthioxanthone, 2,4-di-iso-propylthioxanthone, 2,4-dichlorothioxanthone, benzoin, benzoin iso-butyl ether, chloroxanthenone, benzoin tetrahydropyranyl ether, benzoin methyl ether, benzoin ethyl ether, benzoin butyl ether, benzoin iso-propyl ether, 7H-benzoin methyl ether, benz[de]anthracen-7-one, 1-naphthaldehyde, 4,4'-bis(dimethylamino)benzophenone, 4-phenylbenzophenone, 4-chlorobenzophenone, Michler's ketone, 1-acetonaphthone, 2-acetonaphthone, 1-benzoylcyclohexan-1-ol, 2-hydroxy-2,2-dimethylacetophenone, 2,2-dimethoxy-2-phenylacetophenone, 2,2-diethoxy-2-phenylacetophenone, 1,1-dichloroacetophenone, 1-hydroxyacetophenone, acetophenone dimethyl ketal, o-methoxybenzophenone, triphenylphosphine, tri-o-tolylphosphine, benz[a]anthracene-7,12-dione, 2,2-diethoxyacetophenone, benzil ketals, such as benzil dimethyl ketal, 2-methyl-1-[4-(methylthio)phenyl]-2-morpholinopropan-1-one, anthraquinones such as 2-methylanthraquinone, 2-ethylanthraquinone, 2-tert-butylanthraquinone, 1-chloroanthraquinone, and 2-amylanthraquinone, and 2,3-butanedione.

Also suitable are nonyellowing or low-yellowing photoinitiators of the phenylglyoxylic ester type, as described in DE-A 198 26 712, DE-A 199 13 353 or WO 98/33761.

Preferred among these are the recited acylphosphine oxides, benzophenones, hydroxyacetophenones, and phenylglyoxylic acids.

In particular it is also possible to use mixtures of different photoinitiators.

It is also possible to use incorporable photoinitiators. Incorporable photoinitiators carry polymerizable groups attached to the photoinitiator parent structure by way of spacer groups. Such incorporable photoinitiators are described, for example, in DE-A 195 24 812, EP-A 281 941, and WO 00/24527. Preferred among these are 4-acryloyloxy-2'-chlorobenzophenone, 4-acryloyloxy-3'-chlorobenzophenone, 4-acryloyloxy-4'-chlorobenzophenone, 4-(6'-acryloyloxy-2'-oxa-1'-oxohexyloxy)benzophenone or 1,1-dimethyl-1-hydroxy-4'-(2"-acryloyloxyethoxy) acetophenone.

The photoinitiators may be used alone or in combination with a photopolymerization promoter, of the benzoic acid or amine type, for example, or of similar type.

Preference is given to photoinitiators containing an acylphosphine oxide unit or a benzophenone unit.

The photoinitiators are generally added in amounts of from 0.2 to 10% by weight.

Examples of additives that can be used include antioxidants, oxidation inhibitors, stabilizers, activators (accelerators), fillers, pigments, dyes, degassing agents, luster agents, antistats, flame retardants, thickeners, thixotropic agents, leveling assistants, binders, antifoams, fragrances, surface-active agents, viscosity modifiers, plasticizers, plastifiers, tackifying resins (tackifiers), chelating agents, delusterants, defoamers or compatibilizers.

It is also possible as a component to have one or more photochemically and/or thermally activatable initiators, examples being potassium peroxodisulfate, dibenzoyl peroxide, cyclohexanone peroxide, di-tert-butyl peroxide, azo-bis-iso-butyronitrile, cyclohexylsulfonyl acetyl peroxide, di-iso-propyl percarbonate, tert-butyl peroctoate or benzpinacol, and also, for example, those thermally activatable initiators which have a half life at 80° C. of more than 100 hours, such as di-t-butyl peroxide, cumene hydroperoxide, dicumyl peroxide, t-butyl perbenzoate, silylated pinacols, which are available commercially, for example, under the trade name ADDID 600 from Wacker, or hydroxyl-containing amine N-oxides, such as 2,2,6,6-tetramethylpiperidine-N-oxyl, 4-hydroxy-2,2,6,6-tetramethylpiperidine-N-oxyl, etc.

Further examples of suitable initiators are described in "Polymer Handbook", $2^{nd}$ edition, Wiley & Sons, New York.

Suitable thickeners include, in addition to free-radically (co)polymerized (co)polymers, customary organic and inorganic thickeners such as hydroxymethylcellulose or bentonite.

As chelating agents it is possible, for example, to use ethylenediamineacetic acid and its salts and also β-diketones.

Suitable fillers include silicates, examples being silicates obtainable by hydrolysis of silicon tetrachloride, such as Aerosil® from Degussa, siliceous earth, talc, clay, mica, aluminum silicates, magnesium silicates, calcium carbonates, calcium and barium sulfates, aluminum hydroxides and aluminum oxides, etc., and organic fillers, such as polyacrylic acids, with a molar weight, for example, of between 2000 and 300000, and also cellulose.

Suitable stabilizers include typical UV absorbers such as oxanilides, triazines, and benzotriazole (the latter obtainable as Tinuvin® grades from Ciba-Spezialitätenchemie), and benzophenones. They can be used alone or together with suitable free-radical scavengers, examples being sterically hindered amines such as 2,2,6,6-tetramethylpiperidine, 2,6-di-tert-butylpiperidine or derivatives thereof, e.g., bis(2,2,6, 6-tetramethyl-4-piperidyl) sebacate. Stabilizers are commonly used in amounts of from 0.1 to 5.0% by weight, based on the solid components present in the formulation.

Stabilizers which are additionally suitable are, for example, N-oxyls, such as 4-hydroxy-2,2,6,6-tetramethyl-piperidine-N-oxyl, 4-oxo-2,2,6,6-tetramethylpiperidine-N-oxyl, 4-acetoxy-2,2,6,6-tetramethylpiperidine-N-oxyl, 2,2, 6,6-tetramethylpiperidine-N-oxyl, 4,4',4"-tris(2,2,6,6-tetramethyl-piperidine-N-oxyl) phosphite or 3-oxo-2,2,5,5-tetramethyl-pyrrolidine-N-oxyl, phenols and naphthols, such as p-aminophenol, p-nitrosophenol, 2-tert-butylphenol, 4-tert-butylphenol, 2,4-di-tert-butylphenol, 2-methyl-4-tert-butylphenol, 4-methyl-2,6-tert-butylphenol (2,6-tert-butyl-p-cresol) or 4-tert-butyl-2,6-dimethylphenol, quinones, such as hydroquinone or hydroquinone monomethyl ether, for example, aromatic amines, such as N,N-diphenylamine, N-nitrosodiphenylamine, phenylenediamines, such as N,N'-dialkyl-para-phenylenediamine, the alkyl radicals being identical or different, being composed in each case independently of one another of from 1 to 4 carbon atoms, and being straight-chain or branched, hydroxylamines, such as N,N-diethylhydroxylamine, urea derivatives, such as urea or thiourea, phosphorus compounds, such as triphenylphosphine, triphenyl phosphite or triethyl phosphite, or sulfur compounds, such as diphenyl sulfide or phenothiazine, for example.

The dispersions of the invention are particularly suitable for coating substrates such as paper, paperboard, cardboard, textile, leather, nonwovens, surfaces made of plastic, wood, glass, ceramic, mineral construction materials, such as shaped cement slabs and fiber cement slabs, or metals or coated metals, preferably glass, paper, plastics or metals.

The dispersions of the invention are particularly suitable for coating paper and especially for producing abrasive paper.

The substrates are coated in accordance with standard techniques known to the skilled worker, which involve applying at least one dispersion of the invention to the target substrate in the desired thickness and removing the volatile constituents of the dispersions, with heating where appropriate. This operation may be repeated one or more times if desired. Application to the substrate may take place in a known manner, for example, by spraying, troweling, knife coating, brushing, rolling on, roller coating or flow coating. The coating thickness is situated generally within a range from about 3 to 1000 g/m$^2$ and preferably from 10 to 200 g/m$^2$.

The invention further provides a method of coating substrates wherein the dispersions of the invention, admixed where appropriate with further typical coatings additives and thermally curable resins, are applied to the substrate and dried where appropriate, cured with electron beams or UV exposure under an oxygenous atmosphere or, preferably, under inert gas, and treated thermally, where appropriate at temperatures up to the level of the drying temperature, and subsequently at temperatures up to 160° C., preferably between 60 and 160° C.

The method of coating substrates may also be implemented following the application of the dispersions of the invention by first thermally treating at temperatures up to 160° C., preferably between 60 and 160° C., and then curing with electron beams or UV exposure under oxygen or, preferably, under inert gas.

If desired, the curing of the films formed on the substrate may take place exclusively by means of heat. In general, however, the coatings are cured both by exposure to high-energy radiation and thermally.

If desired, if two or more layers of the coating composition are applied one on top of another, it is possible for thermal and/or radiation curing to take place after each coating operation. Examples of suitable radiation sources for the radiation curing include low, medium, and high pressure mercury lamps and also fluorescent tubes, pulsed lamps, metal halide lamps, electronic flash devices, which allow radiation curing without a photoinitiator, or excimer emitters. Radiation curing takes place through exposure to high-energy radiation, i.e., UV radiation or daylight, preferably light in the wavelength range of λ=200 to 700 nm, with particular preference of λ=200 to 500 nm, and with very particular preference of λ=250 to 400 nm, or by bombardment with high-energy electrons (electron beams; 150 to 300 keV). Examples of radiation sources used include high pressure mercury vapor lamps, lasers, pulsed lamps (flash light), halogen lamps, and excimer emitters. The radiation dose normally sufficient for crosslinking in the case of UV curing is situated within a range from 80 to 3000 mJ/cm$^2$.

It is of course also possible to use two or more radiation sources for curing, from two to four for example.

These sources may also each emit in different wavelength ranges.

Irradiation may be carried out where appropriate in the absence of oxygen as well, under an inert gas atmosphere, for example. Suitable inert gases include preferably nitrogen, noble gases, carbon dioxide, or combustion gases. Irradiation may also take place by covering the coating material with transparent media. Examples of transparent media are polymer films, glass or liquids, such as water. Particular preference is given to irradiation in the manner described in DE-A1 199 57 900.

In addition to or instead of thermal curing, curing may also take place by NIR radiation, which here refers to electromagnetic radiation in the wavelength range from 760 nm to 2.5 μm, preferably from 900 to 1500 nm.

Where appropriate, if two or more layers of the coating composition are applied one on top of another, a thermal, NIR and/or radiation cure can be carried out after each coating operation.

The invention further provides a method of coating substrates which comprises i) coating a substrate with a dispersion as described above,
ii) removing volatile constituents of the dispersion for the purpose of film forming under conditions under which the photoinitiator essentially does not yet form any free radicals,
iii) where appropriate, exposing the film formed in step ii) to high-energy radiation, the film being precured, and then, where appropriate, machining the article coated with the precured film or contacting the surface of the precured film with another substrate, and
iv) completing curing of the film thermally.

Steps iv) and iii) may also be carried out in reverse order: that is, the film can be cured first thermally and then with high-energy radiation.

For the production of abrasive papers, the abrasive is scattered onto the coating while it is still wet, prior to drying, and only then is drying carried out. The abrasive material comprises, for example, diamond, garnet, pumice, tripel, silicon carbide, emery, corundum, aluminum oxides, kieselguhr, sand (abrasuve sand), gypsum, boron carbide, borides, carbides, nitrides, and cerium oxide. This is followed by radiation curing. The resultant coatings feature very good mechanical properties, particularly a high surface hardness.

ppm figures and percentages used in this text are by weight unless otherwise specified.

EXAMPLES

A 2 l polymerization vessel with stirrer and reflux condenser was charged with 445.0 g of deionized water and 35.0 g of a 33% by weight aqueous polymer latex (prepared by free-radically initiated emulsion polymerization of a monomer mixture composed of 100% by weight styrene; polymer solids content 33% by weight) having a weight-average particle diameter of 27 nm, and this initial charge was heated to 85° C. under nitrogen and with stirring. Then 4.6 g of feed stream III were added. Thereafter, beginning simultaneously, while maintaining stirring and the reaction temperature, the remainder of feed stream III was added continuously over the course of 180 minutes and feed strean I was added continuously over the course of 90 minutes to the polymerization batch. After the end of feed stream I, continuous metered addition of feed stream III was continued for 60 minutes and then feed stream II was metered in over the course of 30 minutes. After the end of feed stream II, reaction was continued at reaction temperature for 30 minutes. Subsequently, beginning simultaneously two separate feed streams comprising 6.2 g of a 9.5% strength by weight aqueous solution of tert-butyl hydroperoxide and, respectively, 38.0 g of a 2% by weight aqueous solution of sodium hydroxymethanesulfinate, were metered in continuously over the course of 60 minutes. After the end of the feed streams, at 85° C., the pH of the dispersion was neutralized using 14.2 g of 25% strength by weight sodium hydroxide solution and then 9.1 g of a 2.5% strength by weight aqueous solution of ascorbic acid were metered in over 5 minutes. After the end of the addition, 344.5 g of an ethoxylated trimethylolpropane triacrylate (average degree of ethoxylation 1 per OH group; stabilized with 1 pphm (parts per hundred monomers, i.e. based on 100 parts by weight of monomers) of hydroquinone monomethyl ether and 0.1 pphm of 2,4-di-tert-butylphenol) were metered in with stirring over the course of 40 minutes. The reaction mixture was then cooled to 20–25° C. (room temperature) and filtered through a Perlon filter with a mesh size of 125 m.

Feed stream I is an emulsion prepared from:
357.3 g of deionized water
10.0 g of a 20% strength by weight aqueous solution of a fatty alcohol ethoxylate (alkyl radical: $C_{16}$–$C_{18}$; average degree of ethoxylation: 18)
12.8 g of a 45% strength by weight aqueous solution of Dowfax® 2A1
5.7 g of methacrylic acid (MAA)
5.7 g of butanediol diacrylate
86.1 g of n-butyl acrylate (nBA)
315.8 g of methyl methacrylate (MMA)

Feed stream II is an emulsion prepared from:
160.8 g of deionized water
4.3 g of a 20% strength by weight aqueous solution of a fatty alcohol ethoxylate (alkyl radical: $C_{16}$–$C_{18}$; average degree of ethoxylation: 18)
5.1 g of a 45% strength by weight aqueous solution of Dowfax® 2A1
11.5 g of acrylic acid (AA)
2.9 g butanediol diacrylate
172.2 g of methyl methacrylate (MMA)

Feed stream III:
1.1 g of ammonium peroxodisulfate
44.8 g of deionized water

The resulting aqueous dispersion had a solids content of 45.6% by weight and a pH of 7.4.

Comparative Example 1

The comparative example was prepared in the same way as example 1. The composition of feed streams I and II is as follows:

Feed stream I is an emulsion prepared from:
357.3 g of deionized water
10.0 g of a 20% strength by weight aqueous solution of a fatty alcohol ethoxylate (alkyl radical: $C_{16}$–$C_{18}$; average degree of ethoxylation: 18)
12.8 g of a 45% strength by weight aqueous solution of Dowfax® 2A1
5.7 g of methacrylic acid (MA)
5.7 g of butanediol diacrylate
302.4 g of n-butyl acrylate (nBA)
97.5 g of methyl methacrylate (MMA)

Feed stream II is an emulsion prepared from:
160.8 g of deionized water
4.3 g of a 20% strength by weight aqueous solution of a fatty alcohol ethoxylate (alkyl radical: $C_{16}$–$C_{18}$; averge degree of ethoxylation: 18)
5.1 g of a 45% strength by weight aqueous solution of Dowfax® 2A1
11.5 g of acrylic acid (AA)
2.9 g of butanediol diacrylate
134.8 g of methyl methacrylate (MMA)
39.5 g of n-butyl acrylate (nBA)

The resulting aqueous dispersion had a solids content of 45.2% by weight and a pH of 7.4.

Analysis

The solids contents were determined by drying an aliquot in a drying oven at 140° C. for 6 hours. Two separate measurements were carried out in each case. The figure quoted in the respective examples represents the average of the two measurements.

The pH was determined using a glass electrode and a Handylab1 pH meter from Schott, calibrated to buffers with pH values of 4.0, 7.0, and 9.0.

2. Coating

Dispersions were blended with 1.3% by weight of Irgacure® 500. The substrate was then coated using a doctor blade (200 μm, wet), dried at 60° C. for 15 minutes and then cured with UV radiation.

Performance Properties:

|  | Example 1 | Comparative example 1 |
|---|---|---|
| Pendulum damping |  |  |
| before UV curing | 7 | 10 |
| after UV curing | 103 | 40 |
| Storage stability at 50° C. | >14 days | not measured |
| Tackiness before curing | + | − |

The pendulum damping was tested in accordance with DIN 53157.

For the storage stability test, 250 ml of the dispersion were stored in a closed vessel at 50° C. The criterion for storage stability was met if no phase separation or changes in viscosity were observed after 14 days.

The tackiness of the uncured coatings was determined qualitatively:
tack-free=+
almost tack-free=0
tacky=−

We claim:

1. An aqueous polymer dispersion comprising:
a) 50–70% by weight of polymer particles comprising at least two different copolymers having glass transition temperatures each above 50° C., and synthesized from at least 80% by weight, of at least one principal monomer,
0.1–10%, by weight of at least one auxiliary monomer, and
0–3%, by weight of at least one crosslinker molecule,
with the proviso that the sum makes 100% by weight,
wherein the polymer particles comprise core-shell particles having a core and at least one shell, and
wherein the difference in the glass transition temperatures ($T_g$) of the different polymers is being at least 10° C.; and
b) 30–50%, by weight, of at least one polyfunctional (meth)acrylate, and
wherein the dispersion a) is subjected to physical and/or chemical deodorization.

2. The dispersion of claim 1, wherein at least one principal monomer is selected from the group consisting of methyl methacrylate, n-butyl acrylate and ethylhexyl acrylate.

3. The dispersion of claim 1, wherein at least one auxiliary monomer is selected from the group consisting of methacrylic acid, acrylic acid, acrylamide, 2-hydroxyethyl (meth)acrylate, 2-hydroxypropyl (meth)acrylate, 3-hydroxypropyl (meth)acrylate, 4-hydroxybutyl (meth)acrylate and 4-hydroxybutyl vinyl ether.

4. The dispersion of claim 1, wherein at least one crosslinker molecule is present and is selected from the group consisting of 1,4-butanediol diacrylate, allyl methacrylate, ethylene glycol (meth)acrylate, propylene glycol (meth)acrylate, 1,6-hexanediol di(meth)acrylate, 1,2-ethylene glycol di(meth)acrylate, 1,2-neopentyl glycol di(meth)acrylate, diethylene glycol di(meth)acrylate, triethylene glycol di(meth)acrylate, tetraethylene glycol di(meth)acrylate, trimethylolpropane tri(meth)acrylate, trimethylolethane tri(meth)acrylate, pentaerythritol tri(meth)acrylate, tetra(meth)acrylate and divinylbenzene.

5. The dispersion of claim 1, wherein at least one polyfunctional (meth)acrylate b) is selected from the group consisting of trimethylolpropane triacrylate and acrylates of ethoxylated and/or propoxylated trimethylolpropane or pentaerythritol.

6. The dispersion of claim 1, wherein the polyfunctional (meth)acrylate b) is incorporated into the dispersion at a temperature above 40° C.

7. The dispersion of claim 1, which is subjected to chemical deodorization with an oxidizing and reducing agent.

8. The dispersion of claim 7, wherein the reducing agent is used as the whole amount in excess over the oxidizing agent.

9. The dispersion of claim 7, wherein at least some of the reducing agent is added, following treatment with the oxidizing agent.

10. A method of coating a substrate, comprising coating the substrate with the polymer dispersion as claimed in claim 1.

11. An article obtained by coating a substrate with a polymer dispersion as claimed in claim 1.

12. An article comprising a substrate and a coating formed from the polymer dispersion as claimed in claim 1.

13. The dispersion of claim 2, wherein at least one auxiliary monomer is selected from the group consisting of methacrylic acid, acrylic acid, acrylamide, 2-hydroxyethyl (meth)acrylate, 2-hydroxypropyl (meth)acrylate, 3-hydroxypropyl (meth)acrylate, 4-hydroxybutyl (meth)acrylate and 4-hydroxybutyl vinyl ether.

14. The dispersion of claim 13, wherein at least one crosslinker molecule is present and is selected from the group consisting of 1,4-butanediol diacrylate, allyl methacrylate, ethylene glycol (meth)acrylate, propylene glycol (meth)acrylate, 1,6-hexanediol di(meth)acrylate, 1,2-ethylene glycol di(meth)acrylate, 1,2-neopentyl glycol di(meth)acrylate, diethylene glycol di(meth)acrylate, triethylene glycol di(meth)acrylate, tetraethylene glycol di(meth)acrylate, trimethylolpropane tri(meth)acrylate, trimethylolethane tri(meth)acrylate, pentaerythritol tri(meth)acrylate, tetra(meth)acrylate and divinylbenzene.

15. The dispersion of claim 14, wherein at least one polyfunctional (meth)acrylate b), is selected from the group consisting of trimethylolpropane triacrylate, and acrylates of ethoxylated and/or propoxylated trimethylolpropane or pentaerythritol.

16. The dispersion of claim 15, which is subjected to chemical deodorization with an oxidizing and reducing agent.

17. The dispersion of claim 8, wherein at least some of the reducing agent is added, following treatment with the oxidizing agent.

18. A method of coating a substrate, comprising coating the substrate with the polymer dispersion as claimed in claim 16.

19. An article obtained by coating a substrate with a polymer dispersion as claimed in claim 16.

20. An article comprising a substrate and a coating formed from the polymer dispersion as claimed in claim 16.

21. The dispersion of claim 1, wherein the refractive indices of the core and shell(s) is not more than 0.1.

22. The dispersion of claim 1, wherein the refractive indices of the core and shell(s) is not more than 0.075.

23. The dispersion of claim 1, wherein the refractive indices of the core and shell(s) is not more than 0.05.

* * * * *